United States Patent [19]
Tran et al.

[11] Patent Number: 5,490,144
[45] Date of Patent: Feb. 6, 1996

[54] METHOD AND SYSTEM FOR EFFICIENTLY OPTIMIZING THROUGHPUT AND MINIMIZING DELAY FOR A CHANNEL IN A COMMUNICATION SYSTEM

[75] Inventors: Phieu Tran, Lincolnwood; Jeffrey C. Smolinske, Hoffman Estates; Robert C. Scheibel, Jr., Schaumburg, all of Ill.

[73] Assignee: Motorola, Inc., Schaumburg, Ill.

[21] Appl. No.: 282,935

[22] Filed: Jul. 29, 1994

[51] Int. Cl.$^6$ ............................... H04J 3/16; H04L 12/56
[52] U.S. Cl. .......................................... 370/85.3; 370/95.1
[58] Field of Search .................................. 370/85.2, 85.3, 370/94.1, 95.1

[56] References Cited

U.S. PATENT DOCUMENTS

| | | | |
|---|---|---|---|
| 5,121,391 | 6/1992 | Paneth et al. | 370/95.1 |
| 5,339,313 | 8/1994 | Ben-Michael et al. | 370/85.3 |
| 5,347,521 | 9/1994 | Zijderhand | 370/85.3 |
| 5,359,320 | 10/1994 | Jaffe et al. | 370/85.3 |

OTHER PUBLICATIONS

The Network Layer II: Satellite and Packet Radio Networks, Satellite Packet Broadcasting, 6.1.5 Stability of Slotted ALOHA, 6.1.6 Controlled ALOHA, pp. 265–270., A. Tanenbaum, 1981.

The Network Layer III: Local Networks, Chapter 7, pp. 286–295. A. Tanenbaum, 1981.

"A Limited Sensing Protocol for Multiuser Packet Radio Systems", I. Stavrakakis & D. Kazakos, IEEE Transactions on Communications, vol. 37, No. 4, Apr. 1989, pp. 353–359.

"On Poission Contention Resolution Problem with Feedback Based on Conflict Intensity", Nader Mehravari, IEEE Transactions on Communications, vol. 36, No. 4, Apr. 1988, pp. 513–516.

"Baseline text for TAG 3 (PACS)" Motorola, Inc, Contact C. Stephen Hawkins Feb. 2, 1995, Joint Technical committee (JTC).

Primary Examiner—Douglas W. Olms
Assistant Examiner—Min Jung
Attorney, Agent, or Firm—Darleen J. Stockley

[57] ABSTRACT

The present invention provides a method and system of statistical estimation of uplink traffic using a retry count. A unique spread factor is used for spreading retransmission evenly among backlogged subscriber units, thereby providing dynamic control of the retransmission spread based on the estimated uplink traffic.

17 Claims, 5 Drawing Sheets

100

200

400

500

5,490,144

METHOD AND SYSTEM FOR EFFICIENTLY OPTIMIZING THROUGHPUT AND MINIMIZING DELAY FOR A CHANNEL IN A COMMUNICATION SYSTEM

FIELD OF THE INVENTION

The present invention relates generally to access control in a communication system, and more particularly to optimization of access control in a communication system with respect to throughput and delay.

BACKGROUND

Increasing use of data communications has furthered techniques that provide more cost-effective means of utilizing existing channels of communication networks. One such technique is packetization of traffic information and transmission of the packets between end users in an efficient manner. In known systems all subscriber units share one physical channel. There is a need for efficient contention for the physical channel.

Mobile data communications users, e.g., users of notebook computers, palmtop computers, and personal digital assistant devices, have needs similar to those of data communications users of stationary communication systems. However, hardware systems for providing the needed data transfer capabilities for the mobile data communications are generally circuit in nature, and thus are too expensive for an end user to implement, or alternatively, may often have very limited data rates and/or system capabilities. Thus, mobile data communications users have a need for efficient data throughput.

Thus, as more and more people utilize both stationary and mobile data communications devices, there is a need for developing a method and system for providing more efficient data throughput and minimizing delay in data communications.

BRIEF DESCRIPTIONS OF THE DRAWINGS

DETAILED DESCRIPTION OF A PREFERRED EMBODIMENT

The present invention implements a novel method of statistical estimation of uplink traffic using a retry count. In addition, broadcasting the channel bitmap on the downlink allows the subscriber unit to calculate his retransmission delay time accurately, enabling the subscriber unit to wake up at exactly the right time, thereby optimizing the amount of "sleep time". The present invention further uses a unique spread factor determination for spreading retransmission evenly among backlogged subscriber units by dynamically controlling the retransmission spread based on the estimated uplink traffic. Thus, the present invention provides advantages over other techniques for scheduling channel use.

Figure 1:
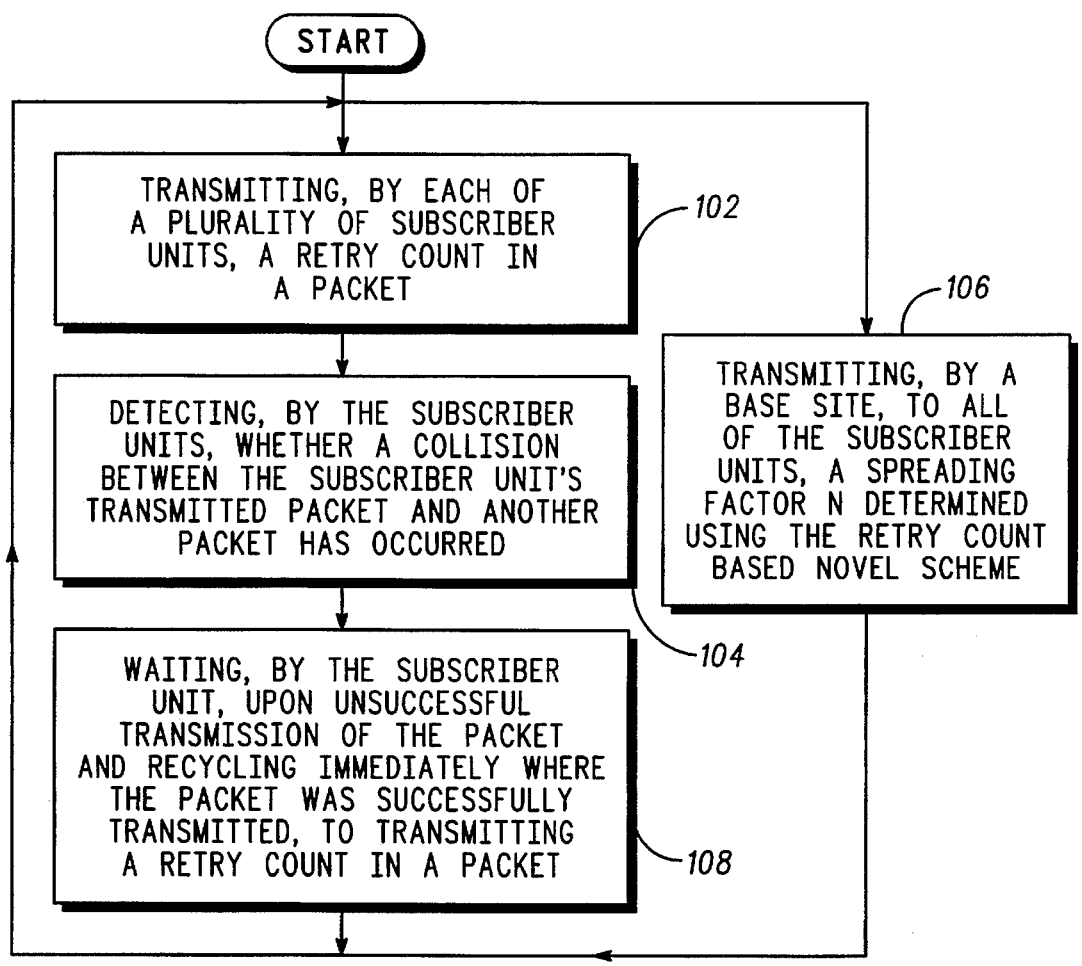
FIG. 1 is a flow chart showing one embodiment of steps in accordance with the method of the present invention.

FIG. 1, numeral 100, is a flow chart showing one embodiment of steps in accordance with the method of the present invention. The method dynamically controls a retransmission time spread of transmission data based on estimated uplink traffic transmissions by a plurality of subscriber units (SUs) on a channel in a communication system utilizing a retry count-based novel scheme. The method includes the steps of: A) transmitting, by each of a plurality of subscriber units, a retry count in a packet (102); B) detecting, by the subscriber units, whether a collision between the subscriber units transmitted packet and another packet has occurred (104); C) waiting, by the subscriber unit, upon unsuccessful transmission of the packet and recycling immediately where the packet was successfully transmitted, to step A (108); and in parallel with steps A–C, D) transmitting, by a base site, to all of the subscriber units, a spreading factor N determined using the retry count-based novel scheme (106). In addition, step C may be selected to include broadcasting, by the base site, a bitmap indicating the status of the time slots of the frame.

Figure 2:
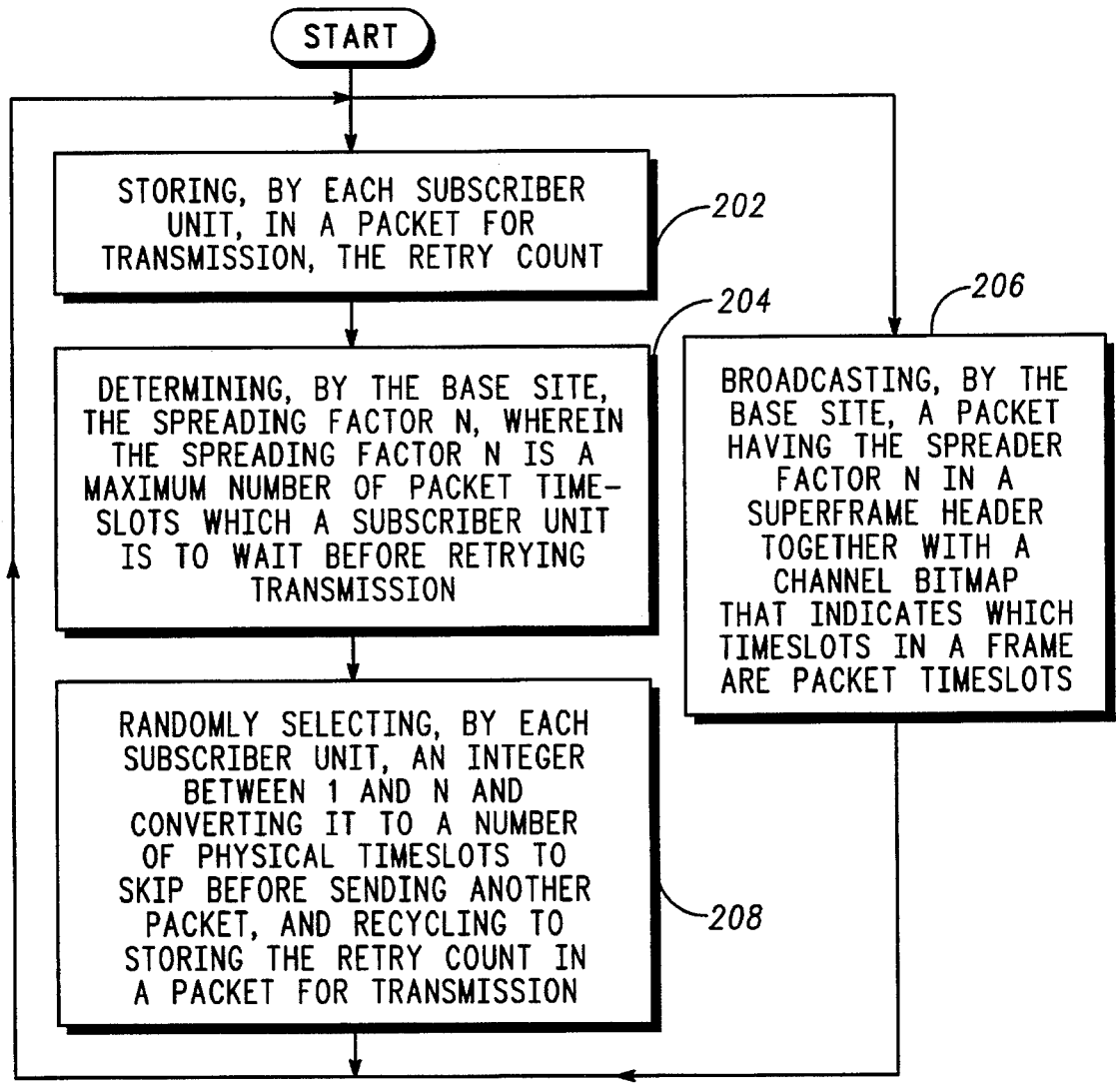
FIG. 2 is a flow chart showing one embodiment of steps for determining the spreading factor N in accordance with the present invention.

As shown in the flow chart of FIG. 2, numeral 200, the novel scheme to determine the spreading factor N typically includes the steps of: A) storing, by each subscriber unit, in a packet for transmission, the retry count (202); B) determining, by the base site, the spreading factor N, wherein the spreading factor N is a maximum number of packet time slots which a subscriber unit is to wait before retrying transmission (204); C) broadcasting, by the base site, a packet having the spreading factor N in a superframe header together with a channel bitmap that indicates which time slots in a frame are packet timeslots (206); and D) randomly selecting, by each subscriber unit, an integer number between 1 and N and converting it to a number of physical timeslots to skip before sending another packet, and recycling to step A (208), where the steps of the subscriber unit and the base site are performed in parallel.

Figure 3:
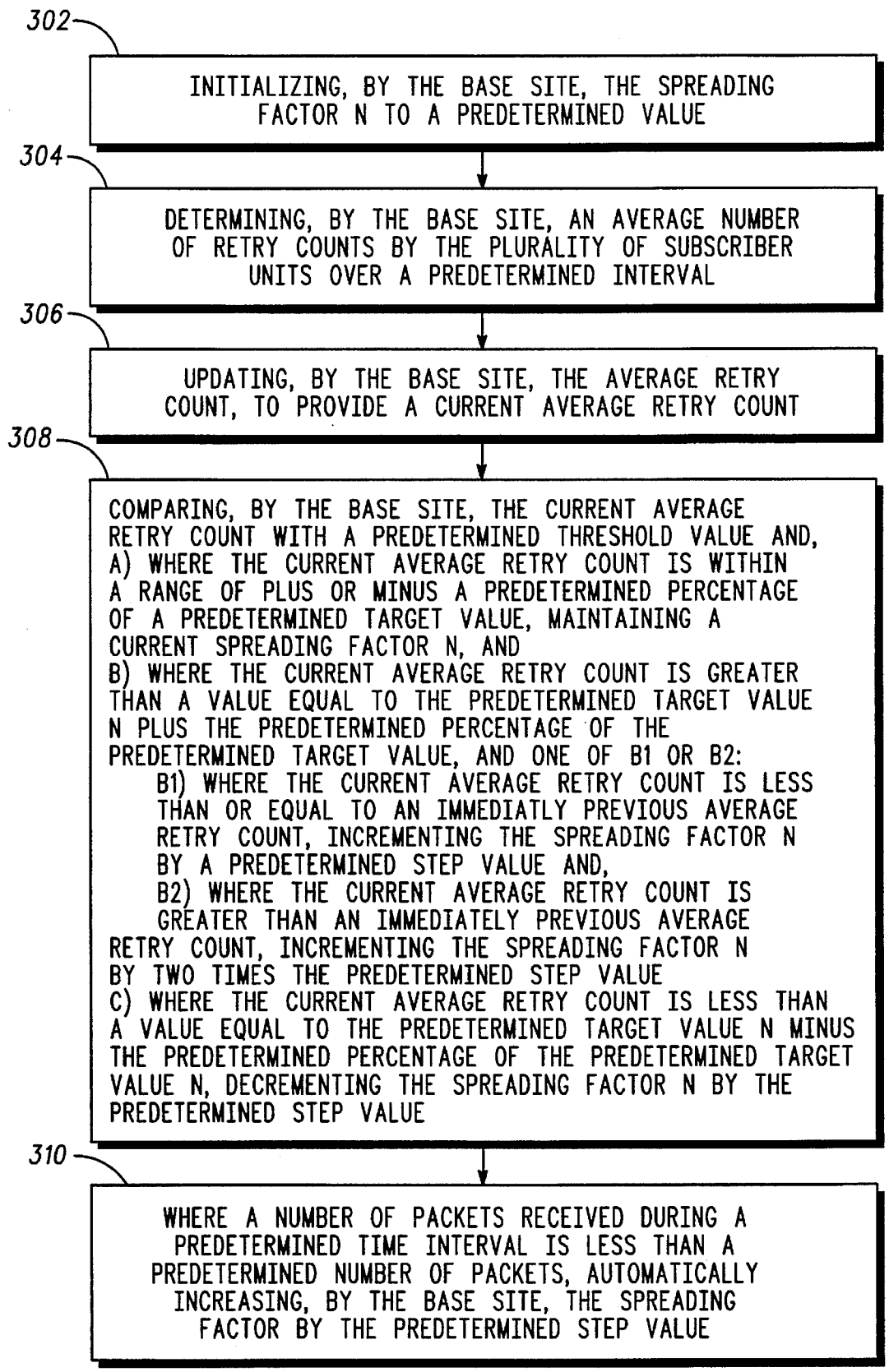
FIG. 3 is a flow chart showing with greater particularity, one embodiment of the steps of FIG. 2 for determining, by the base site, the spreading factor N in accordance with the present invention.

In one embodiment, shown in FIG. 3, numeral 300, the step of determining, by the base site, the spreading factor N further includes the steps of: A) initializing, by the base site, the spreading factor N to a predetermined value (302); B) determining, by the base site, an average number of retry counts by the plurality of subscriber units over a predetermined interval (304); C) updating, by the base site, the average retry count, to provide a current average retry count (306); D) comparing, by the base site, the current average retry count with a predetermined threshold value and, D1) where the current average retry count is within a range of plus or minus a predetermined percentage of a predetermined target value, maintaining a current spreading factor N (308), and D2) where the current average retry count is greater than a value equal to the predetermined target value N plus the predetermined percentage of the predetermined target value (310), and one of D2a–D2b: D2a) where the current average retry count is less than or equal to an immediately previous average retry count, incrementing the spreading factor N by a predetermined step value (312) and, D2b) where the current average retry count is greater than an immediately previous average retry count, incrementing the spreading factor N by two times the predetermined step value (314); D3) where the current average retry count is less than a value equal to the predetermined target value N minus the predetermined percentage of the predetermined target value N, decrementing the spreading factor N by the predetermined step value (316); and E) where a number of packets received during a predetermined time interval is less than a predetermined number of packets, automatically increasing, by the base site, the spreading factor by the predetermined step value (318).

The method of the present invention may be selected to utilize a time division multiplex system. Typically, the time division multiplex system includes a selection scheme for determining active and inactive time slots and the novel scheme for determining the spreading factor N is based on a number of active time slots.

Figure 4:
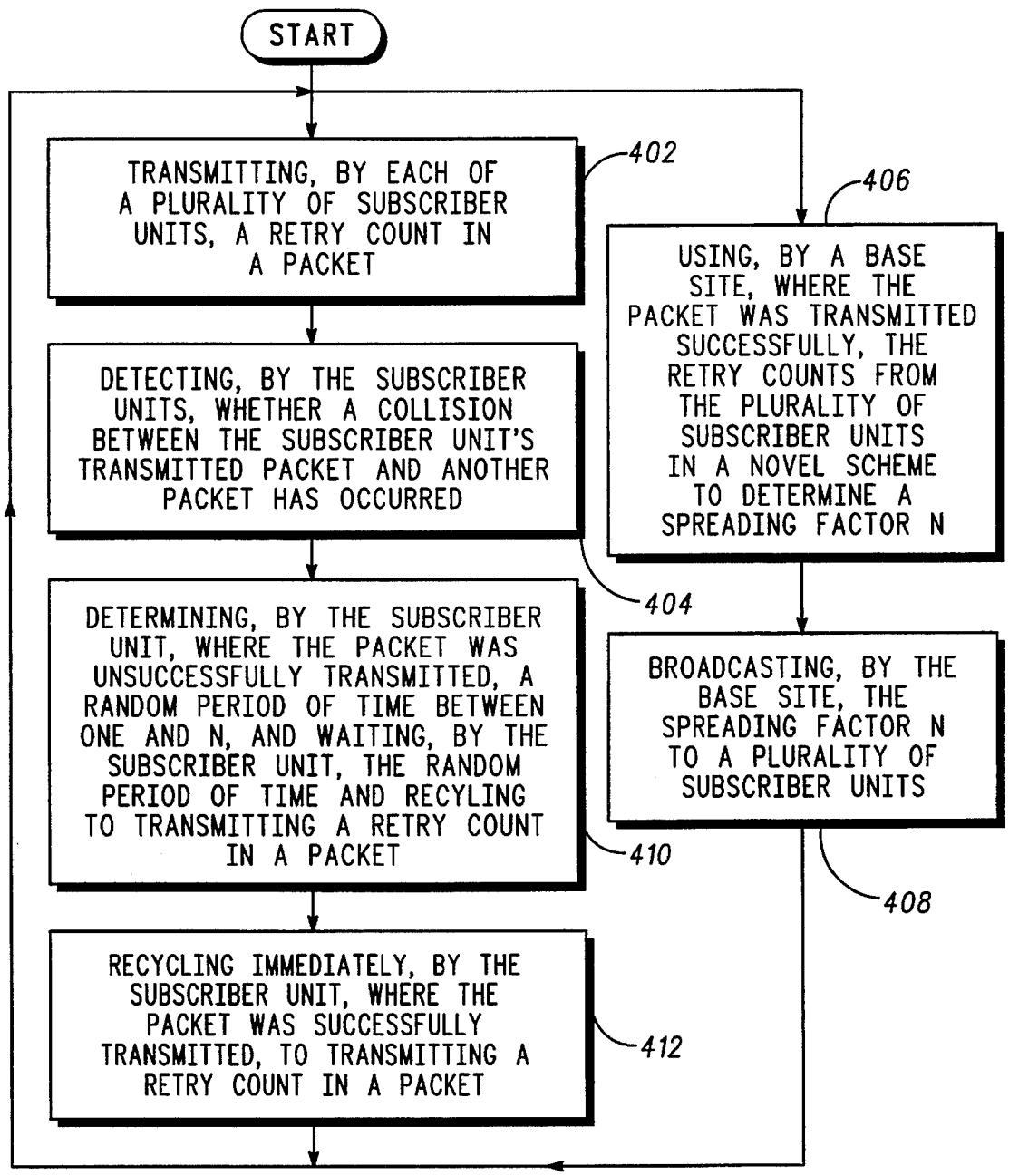
FIG. 4 is a flow chart showing another embodiment of steps in accordance with the method of the present invention.

FIG. 4, numeral 400, is a flow chart showing another embodiment of steps in accordance with the method of the present invention. The method of FIG. 4 provides stability and efficiently optimizes throughput and minimizing delay for transmission of data by a subscriber unit on a channel in a communication system utilizing a contention-based access scheme. The method of the present invention includes: A) transmitting, by each of a plurality of subscriber units, a retry count in a packet (402); B) detecting, by the subscriber units, whether a collision between the subscriber unit's transmitted packet and another packet has occurred (404); C) determining, by the subscriber unit, where the packet was unsuccessfully transmitted, a random period of time between one and N, and waiting, by the subscriber unit, the random period of time and recycling to step A (410); D) recycling immediately, by the subscriber unit, where the packet was successfully transmitted, to step A (412), and in parallel with steps A–D performed by the subscriber units, E) using, by a base site, where the packet was transmitted successfully, the retry counts from the plurality of subscriber units in a novel scheme to determine a spreading factor N (406); and F) broadcasting, by the base site, the spreading factor N to a plurality of subscriber units (408). As described further above, the method may utilize a time division multiplex system. Also, step C, may be selected to include broadcasting, by the base site, a bitmap indicating the status of the time slots of the frame.

Figure 5:
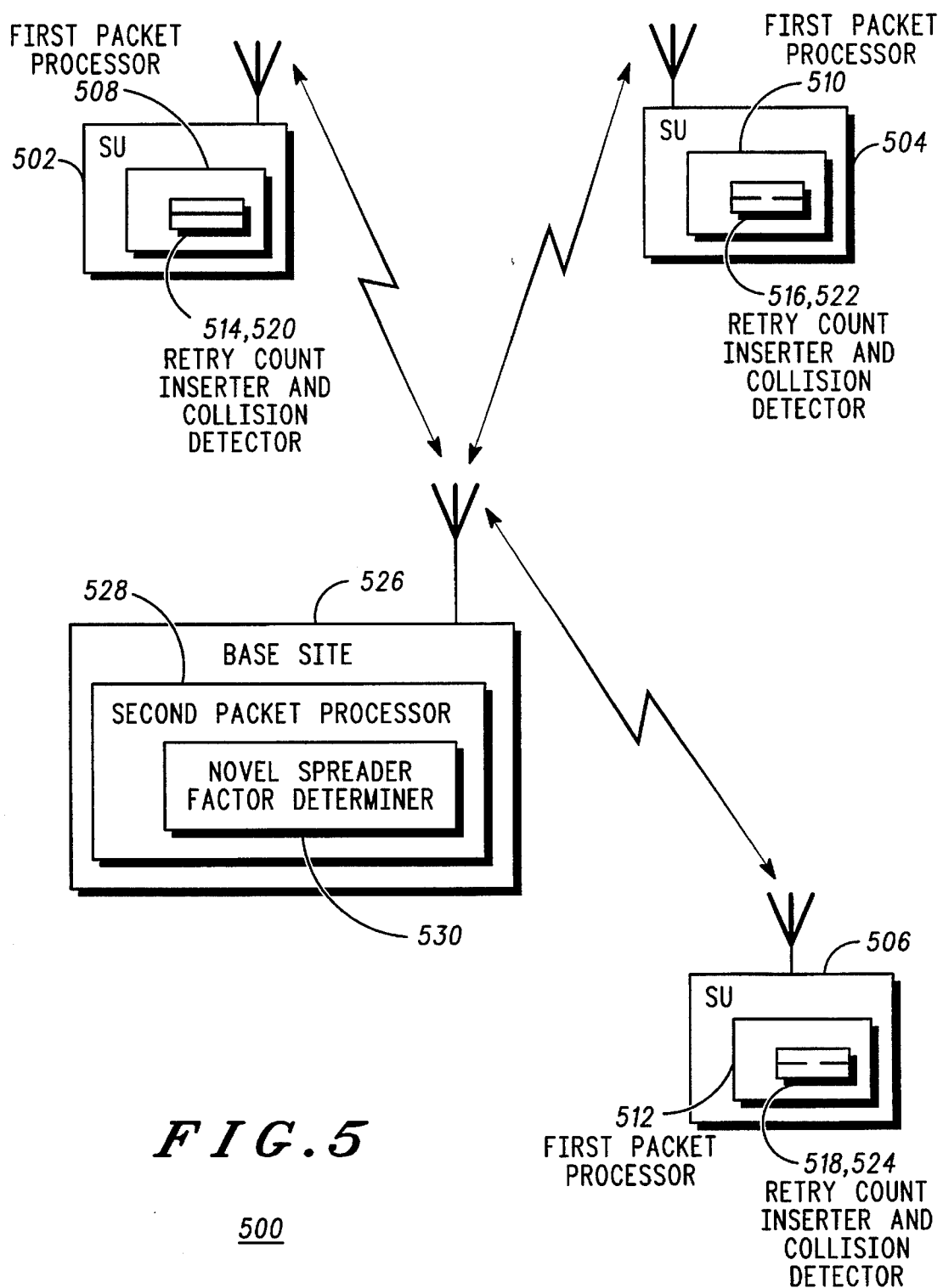
FIG. 5 is a diagram showing an embodiment of a mobile communication system in accordance with the present invention.

FIG. 5, numeral 500, is a block diagram of a system in accordance with the present invention. The system is used for providing stability and efficiently optimizing throughput and minimizing delay for transmission of data by a subscriber unit on a channel in a communication system utilizing a contention-based access scheme. The system includes a plurality of subscriber units (502, 504, 506, . . . ) each having a first packet processor (508, 510, 512, . . . ) that includes a retry count inserter (514, 516, 518, . . . ) and a collision detector (520, 522, 524, . . . ), for transmitting a retry count in each packet of data, detecting whether a collision between the subscriber unit's transmitted packet and another packet has occurred, determining, where the packet was unsuccessfully transmitted, a random period of time between one and N, and waiting the random period of time and recycling to transmitting a retry count in each packet of data, and a base site (526) having a second packet processor (528) with a novel spreader factor determiner (530) for, where the packet was transmitted successfully, utilizing the retry counts from the plurality of subscriber units in a novel scheme to determine a spreading factor N, and broadcasting the spreading factor N to a plurality of subscriber units.

The spreader factor determiner (530) typically utilizes a novel scheme to determine the spreading factor N that includes: storing, by each subscriber unit, in a packet for transmission, the retry count, determining, by the base site, the spreading factor N, wherein the spreading factor N is a maximum number of packet time slots which a subscriber unit is to wait before retrying transmission, broadcasting, by the base site, a packet having the spreading factor N in a superframe header together with a channel bitmap that indicates which time slots in a frame are packet timeslots, and randomly selecting, by each subscriber unit, an integer number between 1 and N and converting it to a number of physical timeslots to skip before sending another packet, and recycling to the beginning of this scheme.

More particularly, in a first embodiment, the base site (526) of the system (500) determines the spreading factor N by: initializing, by the base site, the spreading factor N to a predetermined value, determining, by the base site, an average number of retry counts by the plurality of subscriber units over a predetermined interval, updating, by the base site, the average retry count, to provide a current average retry count, comparing, by the base site, the current average retry count with a predetermined threshold value and, where the current average retry count is within a range of plus or minus a predetermined percentage of a predetermined target value, maintaining a current spreading factor N, and where the current average retry count is greater than a value equal to the predetermined target value N plus the predetermined percentage of the predetermined target value, and one of a–b: a) where the current average retry count is less than or equal to an immediately previous average retry count, incrementing the spreading factor N by a predetermined step value and, b) where the current average retry count is greater than an immediately previous average retry count, incrementing the spreading factor N by two times the predetermined step value, and then, where the current average retry count is less than a value equal to the predetermined target value N minus the predetermined percentage of the predetermined target value N, decrementing the spreading factor N by the predetermined step value, and where a number of packets received during a predetermined time interval is less than a predetermined number of packets, automatically increasing, by the base site, the spreading factor by the predetermined step value.

The system may be selected to employ a time division multiplex system and may include a selection scheme for determining active and inactive time slots and the novel scheme for determining the spreading factor N is based on a number of active time slots. After determining a status of the time slots of a frame, the base site may be selected to broadcast a bitmap indicating the status of the time slots of the frame.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for dynamically controlling a retransmission time spread of transmission data based on estimated uplink traffic transmissions by a plurality of subscriber units on a channel in a communication system utilizing a retry count-based novel scheme, comprising the steps of:

1A) transmitting, by each of a plurality of subscriber units, a retry count in a packet, 1B) detecting, by the subscriber units, whether a collision between the subscriber unit's transmitted packet and another packet has occured, 1C) waiting, by the subscriber unit, upon unsuccessful transmission of the packet and returning to transmitting the retry count in the packet immediately where the packet was successfully transmitted; and in parallel with steps 1A–1C, 1D) transmitting, by a base site, to all of the subscriber units, a spreading factor N, N a positive integer, wherein the spreading factor is determined using the retry count-based novel scheme.

2. The method of claim 1 wherein the novel scheme to determine the spreading factor N comprises the steps of:

2A) storing, by each subscriber unit, in a packet for transmission, the retry count, 2B) determining, by the base site, the spreading factor N, wherein the spreading factor N is a maximum number of packet time slots which a subscriber unit is to wait before retrying transmission, 2C) broadcasting, by the base site, a packet having the spreader factor N in a superframe header together with a channel bitmap that indicates which time slots in a frame are packet timeslots, 2D) randomly selecting, by each subscriber unit, an integer number between 1 and N and converting it to a number of physical timeslots to skip before sending another packet, and returning to storing, by each subscriber unit, in the packet for transmission, the retry count.

3. The method of claim 2 wherein the step of determining, by the base site, the spreading factor N comprises the steps of:

3A) initializing, by the base site, the spreading factor N to a predetermined value, 3B) determining, by the base site, an average number of retry counts by the plurality of subscriber units over a predetermined interval, 3C) updating, by the base site, the average retry count, to provide a current average retry count, 3D) comparing, by the base site, the current average retry count with a predetermined threshold value and, 3D1) where the current average retry count is within a range of plus or minus a predetermined percentage of a predetermined target value, maintaining a current spreading factor N, and 3D2) where the current average retry count is greater than a value equal to the predetermined target value N plus the predetermined percentage of the predetermined target value, and one of 3D2a–3D2b:

3D2a) where the current average retry count is less than or equal to an immediately previous average retry count, incrementing the spreading factor N by a predetermined step value and, 3D2b) where the current average retry count is greater than an immediately previous average retry count, incrementing the spreading factor N by two times the predetermined step value, 3D3) where the current average retry count is less than a value equal to the predetermined target value N minus the predetermined percentage of the predetermined target value N, decrementing the spreading factor N by the predetermined step value, and 3E) where a number of packets received during a predetermined time interval is less than a predetermined number of packets, automatically increasing, by the base site, the spreading factor by the predetermined step value.

4. The method of claim 1 wherein the method utilizes a time division multiplex system.

5. The method of claim 4 wherein the time division multiplex system includes a selection scheme for determining active and inactive time slots and the novel scheme for determining the spreading factor N is based on a number of active time slots.

6. The method of claim 1 wherein transmitting, by a base site, to all of the subscriber units, a spreading factor N includes broadcasting, by the base site, a bitmap indicating the status of the time slots of the frame.

7. A method for providing stability and efficiently optimizing throughput and minimizing delay for transmission of data by a subscriber unit on a channel in a communication system utilizing a contention-based access scheme, comprising the steps of:

7A) transmitting, by each of a plurality of subscriber units, a retry count in a packet, 7B) detecting, by the subscriber units, whether a collision between the subscriber unit's transmitted packet and another packet has occurred, 7C) determining, by the subscriber unit, where the packet was unsuccessfully transmitted, a random period of time between zero and N, N a positive integer, and waiting, by the subscriber unit, the random period of time and returning to transmitting, by each of the plurality of subscriber units, the retry unit in the packet, 7D) returning immediately, by the subscriber unit, where the packet was successfully transmitted, to transmitting, by each of the plurality of subscriber units, the retry count in the packet, and in parallel with the steps performed by the subscriber units, 7E) using, by a base site, where the packet was transmitted successfully, the retry counts from the plurality of subscriber units in a novel scheme to determine a spreading factor N, and 7F) broadcasting, by the base site, the spreading factor N to a plurality of subscriber units.

8. The method of claim 7 wherein the novel scheme to determine the spreading factor N comprises the steps of:

8A) storing, by each subscriber unit, in a packet for transmission, the retry count, 8B) determining, by the base site, the spreading factor N, wherein the spreading factor N is a maximum number of packet time slots which a subscriber unit is to wait before retrying transmission, 8C) broadcasting, by the base site, a packet having the spreading factor N in a superframe header together with a channel bitmap that indicates which time slots in a frame are packet timeslots, 8D) randomly selecting, by each subscriber unit, an integer number between 1 and N and converting it to a number of physical timeslots to skip before sending another packet, and returning to storing, by each subscriber unit, in the packet for transmission, the retry count.

9. The method of claim 8 wherein the step of determining, by the base site, the spreading factor N comprises the steps of:

9A) initializing, by the base site, the spreading factor N to a predetermined value, 9B) determining, by the base site, an average number of retry counts by the plurality of subscriber units over a predetermined interval, 9C) updating, by the base site, the average retry count, to provide a current average retry count, 9D) comparing, by the base site, the current average retry count with a predetermined threshold value and, 9D1) where the current average retry count is within a range of plus or minus a predetermined percentage of a predetermined target value, maintaining a current spreading factor N, and 9D2) where the current average retry count is greater than a value equal to the predetermined target value N plus the predetermined percentage of the predetermined target value, and one of 9D2a–9D2b:

9D2a) where the current average retry count is less than or equal to an immediately previous average retry count, incrementing the spreading factor N by a predetermined step value and, 9D2b) where the current average retry count is greater than an immediately previous average retry count, incrementing the spreading factor N by two times the predetermined step value, 9D3) where the current average retry count is less than a value equal to the predetermined target value N minus the predetermined percentage of the predetermined target value N, decrementing the spreading factor N by the predetermined step value, and 9E) where a number of packets received during a predetermined time interval is less than a predetermined number of packets, automatically increasing, by the base site, the spreading factor by the predetermined step value.

10. The method of claim 7 wherein the method utilizes a time division multiplex system.

11. The method of claim 10 wherein the time division multiplex system includes a selection scheme for determining active and inactive time slots and the novel scheme for determining the spreading factor N is based on a number of active time slots.

12. The method of claim 7 including, in step 7E, broadcasting, by the base site, a bitmap indicating the status of the time slots of the frame.

13. A system for providing stability and efficiently optimizing throughput and minimizing delay for transmission of data by a subscriber unit on a channel in a communication system utilizing a contention-based access scheme, comprising:

13A) a plurality of subscriber units having a packet processor that includes a retry count inserter and a collision detector, wherein the collision detector coupled to receive an output of the retry count inserter, for transmitting a retry count in each packet of data, detecting whether a collision between the subscriber unit's transmitted packet and another packet has occurred, determining, where the packet was unsuccessfully transmitted, a random period of time between zero and N, N a positive integer, and waiting the random period of time and returning to transmitting a retry count in each packet of data, and 13B) a base site having a packet processor with a novel spreader factor determiner for, where the packet was transmitted successfully, utilizing the retry counts from the plurality of subscriber units in a novel scheme to determine a spreading factor N, and broadcasting the spreading factor N to a plurality of subscriber units, wherein the base site spreader factor determiner utilizes a novel scheme to determine the spreading factor N that includes: storing, by each subscriber unit, in a packet for transmission, the retry count, determining by the base site, the spreading factor N, wherein the spreading factor N is a maximum number of packet time slots which a subscriber unit is to wait before retrying transmission, broadcasting, by the base site, a packet having the spreading factor N in a superframe header together with a channel bitmap that indicates which time slots in a frame are packet timeslots, and randomly selecting, by each subscriber unit, an integer number between 1 and N and converting it to a number of physical timeslots to skid before sending another packet, and retaining to the beginning of this scheme.

14. The system of claim 13 wherein the base site determines the spreading factor N by: initializing, by the base site, the spreading factor N to a predetermined value, determining, by the base site, an average number of retry counts by the plurality of subscriber units over a predetermined interval, updating, by the base site, the average retry count, to provide a current average retry count, comparing, by the base site, the current average retry count with a predetermined threshold value and, where the current average retry count is within a range of plus or minus a predetermined percentage of a predetermined target value, maintaining a current spreading factor N, and where the current average retry count is greater than a value equal to the predetermined target value N plus the predetermined percentage of the predetermined target value, and one of a–b: a) where the current average retry count is less than or equal to an immediately previous average retry count, incrementing the spreading factor N by a predetermined step value and, b) where the current average retry count is greater than an immediately previous average retry count, incrementing the spreading factor N by two times the predetermined step value, and then, where the current average retry count is less than a value equal to the predetermined target value N minus the predetermined percentage of the predetermined target value N, decrementing the spreading factor N by the predetermined step value, and where a number of packets received during a predetermined time interval is less than a predetermined number of packets, automatically increasing, by the base site, the spreading factor by the predetermined step value.

15. The system of claim 13 wherein the system employs a time division multiplex system.

16. The system of claim 15 wherein the time division multiplex system includes a selection scheme for determining active and inactive time slots and the novel scheme for determining the spreading factor N is based on a number of active time slots.

17. The system of claim 13 further including that, after determining a status of the time slots of a frame, the base site broadcasts a bitmap indicating the status of the time slots of the frame.

\* \* \* \* \*